United States Patent Office 3,839,540
Patented Oct. 1, 1974

3,839,540
METHOD OF MANUFACTURING SILICON
NITRIDE PRODUCTS
William John Arrol, Solihull, England, assignor to Joseph Lucas (Industries) Limited, Birmingham, England
No Drawing. Filed July 8, 1971, Ser. No. 160,945
Claims priority, application Great Britain, July 10, 1970, 33,573/70
Int. Cl. C01b 21/06; C04b 35/66
U.S. Cl. 423—344                                21 Claims

ABSTRACT OF THE DISCLOSURE

In a method of manufacturing a silicon nitride product a compact containing silicon and a fluxing agent is heated in a nitriding atmosphere to produce a silicon nitride body of dimensions greater than the required finished product, and of density less than the required finished product. The body is then hot pressed to produce a silicon nitride product of the required dimensions and the required density.

---

This invention relates to a method of manufacturing silicon nitride products.

A method according to the invention comprises the steps of heating a compact containing silicon and a fluxing agent in a nitriding atmosphere to produce a silicon nitride body of dimensions greater than the required finished product and of density less than the required finished product, and hot pressing the silicon nitride body to produce a silicon nitride product of the required dimensions and the required density.

Preferably, said compact containing silicon and the fluxing agent has a density of between 1.1 and 1.7 gm./cc.

Preferably, the silicon nitride body has a density of between 1.7 and 2.7 gm./cc.

Preferably, the final, hot pressed product has a density of between 2.7 and 3.2 gm./cc.

Preferably, the silicon is present in said compact in discrete, powder form.

More preferably, the silicon and the fluxing agent are each present in said compact in discrete, powder form.

Preferably, the fluxing agent is magnesium oxide or a compound of magnesium which can be thermally reduced to produce the oxide.

Preferably, the fluxing agent contained by the compact is a magnesium silicate.

Alternatively, the fluxing agent contained by the compact comprises a magnesium compound and a silicon compound, the compounds being chosen so as to form a magnesium silicate at the elevated temperature of the hot pressing operation.

Preferably, the magnesium silicate is the compound $MgO \cdot SiO_2$.

Alternatively, the magnesium silicate is the compound $2MgO \cdot SiO_2$, or is a mixture of the compounds $MgO \cdot SiO_2$ and $2MgO \cdot SiO_2$.

Alternatively, the compact is formed from a mixture of silicon in powder form and a fluxing agent in liquid form, the liquid fluxing agent being converted on heating to the solid flux required for the hot pressing operation.

Preferably, a removable binder is present in the compact of silicon and the fluxing agent, the binder serving to retain the compact in the required shape.

Conveniently, the binder is removed from the compact by heating the compact prior to the nitriding step.

Conveniently, the binder is removed from the compact prior to the nitriding step by heating the compact in the nitriding atmosphere at a temperature below the nitriding temperature, the temperature subsequently being raised to nitride the silicon in the compact.

Preferably, the binder is introduced as a powder into the mixture of silicon and the fluxing agent used to produce the compact.

Alternatively, the binder is introduced into the mixture of silicon and the fluxing agent used to produce the compact as a solution in a liquid which is non-reactive with silicon.

Alternatively, the binder is introduced into the mixture of silicon and the fluxing agent used to produce the compact as a dispersion in a liquid which is non-reactive with silicon.

It is to be appreciated that the term fluxing agent is used herein not only to include materials which themselves will act as fluxes to aid the hot pressing of the silicon nitride body, but also to include materials which on heating are converted into fluxes for the hot pressing process.

In one example of the invention, 1 kilogram of fine silicon powder manufactured by Dunstan & Wragg Limited as grade $3\mu$ was mixed using a high speed rotating disc with three litres of a 2% mixture in water of a magnesium oxide powder fluxing agent. The mixture was then filtered and transferred to a paddle mixer together with a binder in the form of 416 cc. of a dispersion of an acrylic material in water, preferably in the form of a latex sold under the trade name Acronol 4D. The material was mixed for six hours and heat was supplied during the mixing operation to drive off the dispersant and produce a powder. The powder was then rolled to form a compact of dimensions greater than the required finished product, and of density less than the required finished product. In particular, the density of the compact was arranged to be between 1.1 and 1.7 gm./cc. The compact was then loaded directly into a nitriding furnace and heated to a temperature not exceeding 1300° C., typically 1280° C., in an atmosphere consisting of 90% nitrogen and 10% hydrogen by volume to remove the acrylic binder and nitride the silicon to form a porous, substantially all α-phase silicon nitride body. The porous, reaction bonded body thus produced was also arranged to be of dimensions greater than the required product and of density less than the required product. In particular, the density of the reaction bonded, silicon nitride body was arranged to be between 1.7 and 2.7 gm./cc., and in the example described was arranged to be 2.1 gm./cc. The external surface of the body was then spray-coated with boron nitride powder and the coated body was subsequently introduced between graphite dies of the required finished shape, and was hot pressed to finished dimensions and density at a pressure of 4,000 p.s.i. and a temperature of 1750° C. In this particular example the density of the final product was 3.2 gm./cc. It is to be appreciated that the increase in density of the silicon nitride body during the hot pressing process also results in the strength of the final product being increased.

In a second example of the invention, a silica flux, in addition to the magnesium oxide flux, was added to the mixture of silicon powder and the acrylic latex. Conveniently the amount of silica added to the mixture was between 0.01% and 1%, or more preferably between 0.1% and 0.5%, by weight of the mixture, whereas the amount of magnesium oxide added to the mixture was convenient between 0.1% and 10%, or more preferably between 0.5% and 2%, by weight of the mixture. Most preferably the silica and magnesium oxide were present in the mixture in the stoichiometric proportions of the magnesium silicate known as clino-enstatite ($MgO \cdot SiO_2$). After removal of the water dispersant, the powder mixture was formed into a compact of the required shape and was heated in a nitriding atmosphere to 1250° C. to remove the acrylic material, whereafter the temperature was raised to 1400° C. and then to 1550° C. to convert the silicon to predominantly β-phase silicon nitride. The β-phase silicon nitride body thus obtained was arranged to be of dimensions greater than the required finished product but of density less than the required product. The body was then coated with boron nitride powder and was finally hot pressed at 4,000 p.s.i. and a temperature of 1750° C. to give the final product of the required density and shape, the required density being between 2.7 and 2.2 gm./cc.

In a modification of the second example, the mixture of the silica and magnesium oxide fluxes, the silicon powder and the acrylic latex was prepared, but was not heated to remove the dispersant and form a powder. Instead the dough-like material formed from the mixing operation was injection moulded to produce a compact of dimensions greater than the required product, but of density less than the required product. The compact was then heated in a nitriding atmosphere at 1250° C. to drive off the dispersant and to remove the acrylic material, whereafter the temperature was raised to 1550° C. to effect the nitriding step and produce a predominantly β-phase silicon nitride body. The body was then hot pressed to the required dimensions and density in the same way as in the previous examples.

It is to be appreciated that in the second example and the modification thereof, the magnesium oxide and silica fluxes are added to the silicon powder so that the final, hot pressed silicon nitride product contains clino-enstatite, and preferably in proportions up to 10% by weight of the product. However, the relative proportions of the magnesium oxide and silica added to the silicon powder can be varied so that magnesium silicates other than clino-enstatite, such as forsterite ($2MgO \cdot SiO_2$) are formed in the final hot pressed product. As before, if the compound forsterite is produced in the final hot pressed product, or if a mixture of the compounds forsterite and clino-enstatite are produced, then it is desirable that the compound or mixture of compounds is present in the final product in proportions up to 10% by weight of the product. Also instead of the magnesium oxide and silica fluxes described, the magnesium silicates clino-enstatite and forsterite, either individually or as mixtures, or compounds of magnesium and/or silicon other than the oxides, which are capable of being thermally reduced to give the required silicates during the subsequent thermal treatment, could be used as the fluxes. Suitable componds of magnesium and silicon in this respect are magnesium carbonate and ethyl silicate. However it is preferable that the compact to be nitrided and subsqeuently hot pressed contains a magnesium silicate flux, rather than a flux in the form of magnesium oxide, or other suitable magnesium compound, and silica, or other suitable silicon compound.

In a third example of the invention 250 grams of fine silicon powder, as manufactured by Dunstan & Wragg Limited as grade 3μ was mixed with a glass prepared from 6.3 grams of magnesium oxide and 6.2 grams of silica, the glass having been ground to a particle size of less than 40 microns before mixing with the silicon powder. Formation of the mixture was effected by ball milling the powdered components in the presence of 6% mixture of cetyl, alcohol, in methylated spirits. The ball milling was carried out in a polyethene pot using tungsten carbide balls and after 30 minutes the mixture was removed from the pot and oven dried at 90° C. The resultant cake was granulated by passage through a 200 mesh sieve and the sieved mixture was pressed in a steel die at 5,000 p.s.i. to produce a compact in the form of a disc 2 inches in diameter and 0.5 inch thick. The cetyl alcohol provided a temporary binder for the compact and, after the pressing operation, was removed by heating the compact in air to 700° C. the temperature being raised at 50° C. per hour to 300° C. and thereafter being raised at 100° C. per hour until the required final temperature was reached. After removal of the binder the density of the compact was 1.28 gm./cc., the compact then being nitrided in a forming gas atomsphere by heating initially at 1150° C. for 20 hours and then finally at 1320° C. for 48 hours. The resulting silicon nitride body was substantially in its α-phase and had a density of 2.03 gm./cc. The body was then coated with boron nitride powder and was subsequently hot pressed between graphite dies at a temperature of 750° C. for 1 hour to produce a silicon nitride product of the required dimensions and density.

In a fourth example of the invention, silicon powder was intimately mixed with 1% of a magnesium oxide fluxing agent, the initial particle sizes of the two materials being in the region of 3 microns. The mixing of the two materials was effected by wet ball milling for 30 minutes in propanol and after the mixing operation the excess propanol was removed by heating. The resulting cake was crushed, screened through a 400 B.S. sieve and was then mixed with 5% by weight of an acrylic co-polymer binder sold under the trade name Acronal 500L and added as a 10% solution in acetone. The mixture formed a clay which was subsequently injected through an extrusion nozzle into a suitably shaped die so as to produce a compact of dimensions greater than the required product, but of density less than the required product. After removal from the die, the moulded compact was heated in a forming gas atmosphere at a temperature of 1350° C. to remove the temporary binder, and the water disperant, and convert the silicon in the compact to substantially all α-phase silicon nitride. The silicon nitride body thus produced was then spray-coated with boron nitride powder and was finally hot pressed at a pressure of 3,000 p.s.i. and a temperature of 1700° C. to produce a product of the required shape, the required dimensions, and the required density.

In a fifth example of the invention, silicon powder was again intimately mixed with 1% of a magnesium oxide fluxing agent, but in this example the mixing operation was carried out by wet ball milling the two materials for 30 minutes in a 16% by weight solution of cellulose nitrate in acetone, the ratio of solid to liquid during milling being 1:1. Excess solution was then filtered off so that the mixture formed a clay consisting of silicon, the magnesium oxide flux, acetone, and cellulose nitrate, the cellulose nitrate defining a removable binder. The clay was subsequently injected through an extrusion nozzle into a suitably shaped die so as to produce a compact which, after removal from the die, was heated at 450° C. in air to remove the acetone and the binder. The silicon in the compact was then nitrided to produce a porous silicon nitride body of the same shape, but of dimensions greater than, and density less than, the required finished product. The porous body was then isostatically, hot pressed to produce a product of the required shape, and the required dimensions, and the required density. One suitable known technique for performing the isostatic hot pressing of the silicon nitride body involved surrounding the body with a powder mixture containing between 5% to 40% by weight of an alkaline metal or alkaline earth metal fluoride, chloride or silicate as a first component, and between 60% and 95% by weight of a second component comprising one or more of the following compounds, that is silica, alumina, zirconia, magnesium oxide, calcium oxide, spinels mullite and anhydrous aluminosilicates. The mixture was heated to a temperature at which it became plastic and then pressure was applied to the mixture to hot press the body and produce the required, finished product.

In a sixth example of the invention, a mixture of silicon and magnesium oxide powders was produced and, without the addition of a binder, the mixture was isostatically pressed at a pressure of 20,000 p.s.i. and at room temperature to produce a compact having the shape of the required finished product, but being of dimensions greater than and density less than the required product. Nitriding of the compact and subsequent hot pressing of the silicon nitride body produced were carried out as in the previous example.

It is to be appreciated that a compact of silicon and a fluxing agent can be formed by other techniques than those already described, such as, for example, by slip casting, flame spraying and electrophoretic deposition. Further, once a compact has been produced the compact can be partially nitrided to produce a body containing 8% to 10% silicon nitride or can be sintered into a silicon body in a non-nitrogen containing atmosphere. In either case, the body produced can then be reshaped, by any convenient form of machining, before being nitrided to produce a reaction bonded, silicon nitride body of density less than the required finished product but of dimensions greater than the required product.

Also it is to be appreciated that besides the powdered fluxing agent used in the above example, a liquid fluxing agent could be mixed with silicon powder to produce a compact provided the liquid fluxing agent was converted on heating to the solid flux required for the hot pressing of the silicon nitride body. By way of example, suitable liquid phase fluxing agents are solutions of magnesium nitrate and magnesium acetate, both of which are converted to solid magnesium oxide on heating.

In carrying out the method of the invention, it is desirable that the nitriding of the silicon compact should produce a substantially all α-phase silicon nitride body since, in this way, the formation of a fine grain, high strength silicon nitride product by the hot pressing operation is enhanced. However, as in the second example, it is possible to obtain satisfactory results with a substantially β-phase silicon nitride body if the fluxing agent in the compact is clino-enstatite and/or forsterite, this being the preferred arrangement, or if the fluxing agent is arranged so that clino-enstatite and/or forsterite are produced in the hot pressed product.

Finally, it is to be appreciated that in each of the examples described above, fibrous materials, such as alumino-silicate fibres, or whisker materials such as silicon nitride whiskers, could be added to the mixture of silicon and the fluxing agent used to produce the compact.

What is claimed is:

1. A method of manufacturing silicon nitride products comprising the steps of forming a compact from a mixture of powdered silicon and a fluxing agent for aiding the pressure sintering of silicon nitride, heating said compact in a nitriding atmosphere to produce a silicon nitride body of dimensions greater than the required finished product and of density less than the required finished product, and hot pressing said silicon nitride body to produce a silicon nitride product of the required dimensions and the required density.

2. A method as claimed in Claim 1 wherein said compact containing silicon and the fluxing agent has a density of between 1.1 and 1.7 gm./cc.

3. A method as claimed in Claim 1 wherein the silicon nitride body has a density of between 1.7 and 2.7 gm./cc.

4. A method as claimed in Claim 1 wherein the final, hot pressed product has a density of between 2.7 and 3.2 gm./cc.

5. A method as claimed in Claim 1 wherein the silicon is present in said compact in discrete, powder form.

6. A method as claimed in Claim 1 wherein the silicon and the fluxing agent are each present in said compact in discrete, powder form.

7. A method as claimed in Claim 1 wherein the fluxing agent is magnesium oxide or a compound of magnesium which can be thermally reduced to produce the oxide.

8. A method as claimed in Claim 1 wherein the fluxing agent contained by the compact is magnesium silicate.

9. A method as claimed in Claim 1 wherein the fluxing agent contained by the compact comprises a magnesium compound and a silicon compound, the compounds being chosen so as to form a magnesium silicate at the elevated temperature of the hot pressing operation.

10. A method as claimed in Claim 8 wherein the magnesium silicate is the compound $MgO \cdot SiO_2$ and the arrangement is such that the hot pressed product contains up to 10% by weight of said compound.

11. A method as claimed in Claim 8 wherein the magnesium silicate is the compound $2MgO \cdot SiO_2$, or is a mixture of the compounds $MgO \cdot SiO_2$ and $2MgO \cdot SiO_2$ and the arrangement is such that the hot pressed product contains up to 10% by weight of said compound or the mixture of said compounds.

12. A method as claimed in Claim 1 wherein the compact is formed from a mixture of silicon in powder form and a fluxing agent in liquid form, the liquid fluxing agent being converted on heating to the solid flux required for the hot pressing operation.

13. A method as claimed in Claim 1 wherein a removable binder is present in the compact of silicon and the fluxing agent, the binder serving to retain the compact in the required shape.

14. A method as claimed in Claim 13 wherein the binder is removed from the compact by heating the compact prior to the nitriding step.

15. A method as claimed in Claim 13 wherein the binder is removed from the compact prior to the nitriding step by heating the compact in the nitriding atmosphere at a temperature below the nitriding temperature, the temperature subsequently being raised to nitride the silicon in the compact.

16. A method as claimed in Claim 13 wherein the binder is introduced as a powder into the mixture of silicon and the fluxing agent used to produce the compact.

17. A method as claimed in Claim 13 wherein the binder is introduced into the mixture of silicon and the fluxing agent used to produce the compact as a solution in a liquid which is non-reactive with silicon.

18. A method as claimed in Claim 13 wherein the binder is introduced into the mixture of silicon and the fluxing agent used to produce the compact as a dispersion in a liquid which is non-reactive with silicon.

19. A method as claimed in Claim 1 wherein the silicon nitride body formed from the compact is of the same shape as the required finished product, but is of dimensions greater than, and density less than, the required product, the body being hot pressed to produce the required product by an isostatic hot pressing technique.

20. A method as claimed in Claim 9 wherein the magnesium silicate is the compound $MgO \cdot SiO_2$ and the arrangement is such that the hot pressed product contains up to 10% by weight of said compound.

21. A method as claimed in Claim 9 wherein the magnesium silicate is the compound $2MgO \cdot SiO_2$, or is a mixture of the compounds $MgO \cdot SiO_2$ and $2MgO \cdot SiO_2$ and the arrangement is such that the hot pressed product contains a 10% by weight of said compound or the mixture of said compounds.

References Cited

UNITED STATES PATENTS

| | | | |
|---|---|---|---|
| 2,618,565 | 11/1952 | Nicholson | 423—344 |
| 2,561,583 | 7/1951 | Marvin | 75—226 X |
| 2,798,810 | 7/1957 | Goetzel et al. | 75—226 X |

FOREIGN PATENTS

| | | | |
|---|---|---|---|
| 1,092,637 | 11/1967 | Great Britain | 23—191 |

OTHER REFERENCES

G. G. Deeley et al.: "Dense Silicon Nitride," Powder Metallurgy, No. 8, 1961, pp. 145–151.

OSCAR R. VERTIZ, Primary Examiner

H. S. MILLER, Assistant Examiner

U.S. Cl. X.R.

106—55